UNITED STATES PATENT OFFICE.

ABRAHAM T. HARPER, OF PORTLAND, MAINE.

ELASTIC POLISHER.

SPECIFICATION forming part of Letters Patent No. 238,502, dated March 8, 1881.

Application filed July 15, 1880. (No model.)

*To all whom it may concern:*

Be it known that I, ABRAHAM T. HARPER, of Portland, in the county of Cumberland and State of Maine, have invented certain new and useful Improvements in Elastic Polishers; and I do hereby declare that the following is a full, clear, and exact description of the invention, which will enable others skilled in the art to which it appertains to make and use the same.

My composition consists of the following ingredients, combined in the proportions stated, viz: emery, in twelve parts, seven parts; rubber, in twelve parts, four and one-half parts; sulphur, in twelve parts, one-half part. These ingredients are to be thoroughly mingled together. This may be done in the usual manner, (to which I give preference,) by the use of the calender in the well-known method practiced by makers of rubber goods, by rolling a sheet of rubber back and forth between the heated cylinders of that instrument until the rubber is brought to a softened and sticky condition, and then, while this rolling is continued, feeding the emery and sulphur to it by sprinkling them upon it and thoroughly commingling them by further rolling. By continuing the passing of the rubber back and forth through the rolls after the emery and sulphur have been sprinkled upon it I knead these ingredients of my composition together. The softened and sticky condition into which the rubber has first been brought renders it easy to completely mix the ingredients together in this way. This thorough commingling between the rollers is essential to the success of the process and produces the perfected condition of the elastic polisher. After the rubber is taken from the calender, and when the mixing is completed, I cut it into convenient form for handling and for sale, as a cylinder of three-quarter-inch diameter and two inches length. Next, after putting my compound into form for sale, I vulcanize it by subjecting it to heat of 250° Fahrenheit for ten hours.

A slight degree of elasticity is obtained to my polisher, which in its use operates to bring the emery fully into contact with all parts of the surface on which it is applied, over and between any unevennesses which may exist upon it, and thus accomplish quickly and easily the polishing of all parts to a uniform degree.

This polisher is applied in use by mere rubbing back and forth over the article requiring polish.

I am aware that emery, rubber, and sulphur have been mixed in various proportions and then vulcanized for use as grinding and polishing tools or materials. I do not claim the inventions set out in the patents of T. A. Jenckes, No. 34,428, February 18, 1862, and F. Copeland, No. 224,078, February 3, 1880.

I do not claim the combination of rubber and emery as set out in the Patent No. 25,747, October 11, 1859, to T. J. Mayall, and No. 27,817, April 10, 1860. These are for different compounds from mine and produce an article of different consistency.

The Patent No. 125,600, of 1872, differs from mine in the process of producing the article and the article made. I do not claim mixing the sulphur and emery, grinding the compound, then dissolving the mixture in a solvent and evaporating the solvent, as shown in said patent.

What I claim, and desire to secure by Letters Patent of the United States, is—

The herein-described composition of matter, to be used for polishing metallic surfaces which have, by rust or other means, lost their polish, consisting of emery, rubber, and sulphur, in the proportions specified.

In testimony that I claim the foregoing as my own I affix my signature in presence of two witnesses.

ABRAHAM T. HARPER.

Witnesses:
HERBERT M. SYLVESTER,
JOHN P. KERRIGAN.